Dec. 29, 1936.    W. L. SCRIBNER    2,065,614
TELLTALE ROLLER BEARING CONSTRUCTION
Filed March 14, 1935
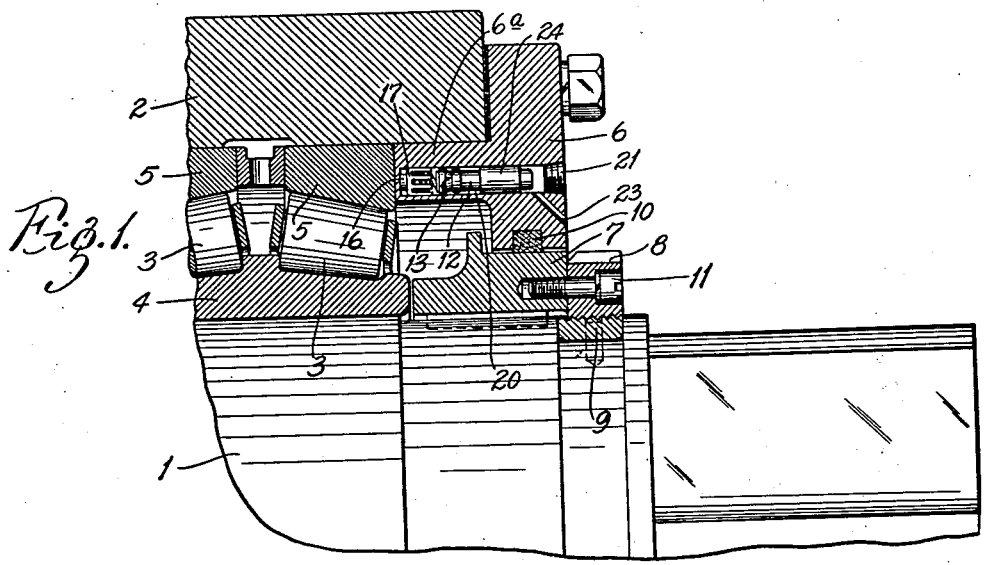
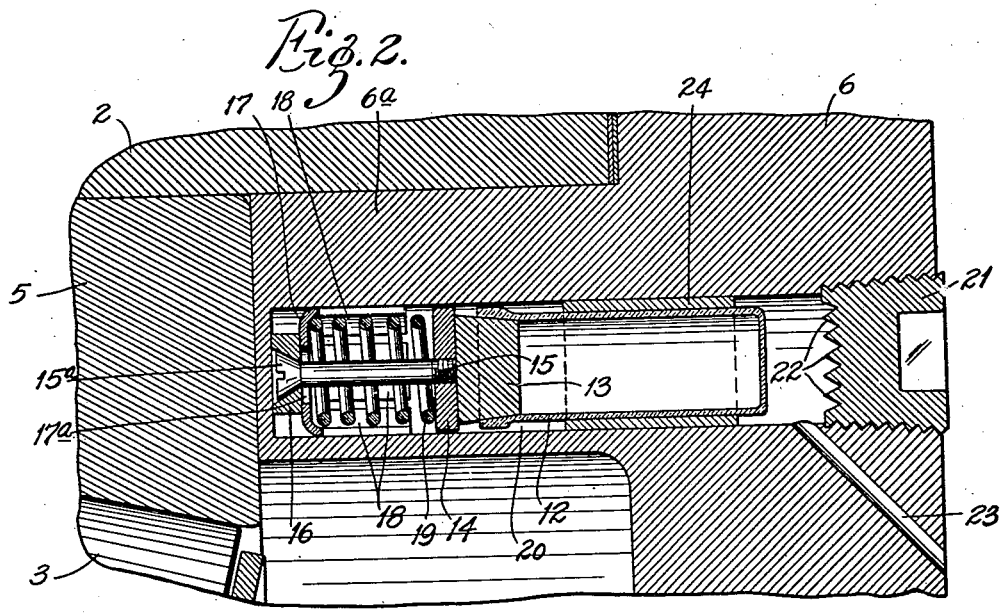
INVENTOR.
William L. Scribner
by Carrett Carrett Gravely
HIS ATTORNEYS.

Patented Dec. 29, 1936

2,065,614

UNITED STATES PATENT OFFICE 2,065,614

TELLTALE ROLLER BEARING CONSTRUCTION

William L. Scribner, Canton, Ohio, assignor to The Timken Roller Bearing Company, Canton, Ohio, a corporation of Ohio Application March 14, 1935, Serial No. 10,987

4 Claims. (Cl. 116—106)

This invention relates to roller bearing constructions of the kind that are equipped with thermic telltale devices for indicating an overheated condition of the bearing. The invention has for its principal objects to provide an efficient telltale device of simple, cheap and compact construction which can be readily incorporated in a roller or other antifriction bearing construction. The invention consists in the telltale and in the construction, combinations and arrangements of parts hereinafter described and claimed.

In the accompanying drawing, which forms part of this specification and wherein like symbols refer to like parts wherever they occur, Fig. 1 is a fragmentary vertical longitudinal section through a roller bearing mill roll construction equipped with a telltale device embodying my invention; and Fig. 2 is a similar view showing the telltale and the parts adjacent thereto on an enlarged scale.

Referring to the accompanying drawing, my invention is shown in connection with a roller bearing construction for the roll of a rolling mill; but it is also applicable to other antifriction bearing axles or shaft constructions. In the construction shown, the antifrictionally mounted mill roll 1 extends through and is rotatably supported in a suitable housing 2 by means of an antifriction bearing, preferably a taper roller bearing, including one or more series of conical rollers 3 interposed between a cone or inner raceway member 4 mounted on said roll and a cup or outer bearing member 5 mounted in the bearing housing or enclosure. The annular space between the roll and the end of the bearing housing 2 is closed by an annular plate 6 that is bolted to said housing and a filler ring 7 that fits within said annular plate and is keyed to said roll. The end closure plate 6 has an inwardly extending annular flange 6a disposed in abutting relation to the roller bearing cup 5; and the filler ring is disposed with its inner end in abutting relation to the bearing cone 4. The filler ring 7 is held in place by a ring nut 8 threaded on a split ring 9 pinned in an annular groove provided therefor in the roll 1. Said nut is locked in the desired adjusted position by means of a screw 11 adapted to extend through any one of a series of holes in said nut into a threaded hole in the ring 7. A suitable oil seal 10 is mounted in the inner periphery of the end closure plate 6 and serves to prevent the escape of oil from and the entry of dust into the bearing housing.

According to the present invention, the above roller bearing mill roll construction is provided with a telltale or signal device for indicating to the sense of smell and/or sense of sight an overheated condition of the bearing. Said telltale or signal device comprises a closed container in the form of a hollow cylindrical vessel or cartridge 12 of glass or other frangible material capable of being easily broken. The glass container or bottle 12 is provided at one end with a filler opening sealed in any desired manner, preferably by means of a suitable closure member in the form of a tapered stopper or plug 13 of any suitable material not affected by the contents of the container. Cooperating with said container is a projecting device comprising a disk or plunger 14 threaded or otherwise removably secured to one end of a plunger rod or pin 15 whose opposite end has a flat, countersunk screw head 15a adapted to seat within a countersunk hole provided therefor in a fusible member or disk 16. Sleeved on the plunger rod 15 between the fusible disk 16 and the plunger disk 14 is a cup-shaped member 17, whose rod receiving opening 17a is large enough to permit the passage of the screw head 15a therethrough and whose side walls are slotted to form a series of circumferentially spaced spring fingers 18 that extend in the direction of the stopper. A coil spring 19 is sleeved on the screw and is held under compression between the plunger disk 14 and the bottom of the cup member 17 and thus holds the fusible disk 16 against the head of said screw.

The above described telltale device is preferably mounted in a longitudinal bore 20 provided therefor in the end closure plate 6 opposite the cup or outer raceway member 5 of the roller bearing. The bore 20 extends almost to the cup engaging surface of the end closure plate so as to leave a relatively thin wall through which heat from the bearing may be readily transmitted. The outer end of the bore 20 is closed by a threaded plug 21 provided at its inner face with one or more pointed projections 22. An outlet passageway 23 inclines downwardly and outwardly from a point inwardly of the plug 21 to the outer surface of the annular end closure plate 6.

In the use of the above telltale device, the projecting device with the spring 19 thereof under compression, is inserted within the bore 20 provided therefor in the end closure member 6 with the fusible member 16 in abutting relation to the inner end of the bore. The cartridge 12, after being filled with an odoriferous and/or vapor or smoke producing compound and sealed with the stopper 13, is then inserted in the bore 20 with the stopper in abutting relation to the plunger disk 14 at the outer end of the projecting device. The outer end of the bore 20 is then closed by means of the plug 21. With the parts thus positioned in the bore, the projecting device is held in position by the pressure of the spring fingers 18 of the cup 17 against the wall of the bore; and the glass container 12 is protected from breakage due to vibration by means of a tube 24 of paper or other soft material that fills the annular space between the container and the bore. In the event that the cup 5 of the bearing becomes heated to a critical temperature due to defects or unusual conditions in the bearing assembly, the fusible disk 16 will melt and thus release the compressed spring 19, the sudden expansion of which forces the plunger 14 outwardly in the bore 20 and projects the glass container 12 against the inner face of the plug 21 for the bore with sufficient force to break the container and thereby permit the material therein to escape through the outlet passageway 23 to the atmosphere. The smoke and odor produced by the escaping material constitutes a warning signal which appeals to the sense of sight and sense of smell and thus indicates that the bearing requires attention.

It is obvious that the above described construction permits the telltale device to be again used merely by replacing the fusible member and substituting for the shattered container a new container filled with the required material. The telltale device is simple and inexpensive and can be quickly and easily applied to roller bearing axle and shaft constructions without material alteration thereof.

What I claim is:

1. In combination, a shaft, a housing therefor, a roller bearing interposed between said shaft and said housing, said housing having a bore therein terminating at its inner end adjacent to said roller bearing, a removable closure for the outer end of said bore, said housing having a passageway leading from said bore to the atmosphere, and a thermic telltale mounted in said bore and adapted to be operated by a predetermined temperature of said bearing, said telltale comprising a frangible container, a fusible member bearing against the inner end of said bore, and means located entirely between the bore engaging end face of said fusible member and said container and releasable by said fusible member for forcibly projecting said container against the closure for the outer end of said bore.

2. In combination, a shaft, a housing therefor, a roller bearing interposed between said shaft and said housing, said housing having a bore therein terminating at its inner end adjacent to said roller bearing, a removable closure for the outer end of said bore, said housing having a passageway leading from said bore to the atmosphere, and a thermic telltale mounted in said bore and adapted to be operated by a predetermined temperature of said bearing, said telltale comprising a frangible container, a fusible member, and a spring releasable by said fusible member for forcibly projecting said frangible container against the closure for said bore, said closure being provided with sharp projections to insure breakage of said container.

3. In combination, a shaft, a housing therefor, a roller bearing interposed between said shaft and said housing, said housing being provided with a bore in communication with the atmosphere and terminating at its inner end adjacent to said roller bearing, and a thermic telltale mounted in said bore and adapted to be operated by a predetermined temperature of said bearing, said telltale comprising a frangible container adapted to contain a signaling material, a pin interposed between said container and the inner end of said bore and provided at one end with a head, a fusible member mounted on said pin and bearing against said inner end of said bore and having a countersunk hole for the reception of said head of said pin, a disk fixed to the other end of said pin, and a coil spring surrounding said pin and held under compression between the fusible member and the disk thereon.

4. In combination, a shaft, a housing therefor, a roller bearing interposed between said shaft and said housing, said housing being provided adjacent to said bearing with a bore in communication with the atmosphere, and a thermic telltale mounted in said bore and adapted to be operated by a predetermined temperature of said bearing, said telltale comprising a frangible container for a signaling material, a plunger disposed opposite the inner end of said container, a pin having one end secured to said plunger and provided at its other end with a head, a fusible member mounted on said pin in abutting relation to said head, a cup sleeved on said pin and having its pin receiving opening larger than the pin head, said cup having spring fingers adapted to frictionally engage said bore, and a coil spring surrounding said pin and held under compression between said cup and said plunger.

WILLIAM L. SCRIBNER.